March 3, 1970  H. MESSINGER ET AL  3,498,026
ION EXCHANGE PROCESS AND APPARATUS FOR CONTINUOUS
REMOVAL OF GASES
Filed June 24, 1968

INVENTORS
HARRY MESSINGER
JOSEPH F. DALY

BY

ATTORNEYS

United States Patent Office 3,498,026
Patented Mar. 3, 1970

3,498,026
ION EXCHANGE PROCESS AND APPARATUS FOR CONTINUOUS REMOVAL OF GASES
Harry Messinger, 305 Sumner Road, Annapolis, Md. 21401, and Joseph F. Daly, 5615 Regency Park Court, Suitland, Md. 20023
Filed June 24, 1968, Ser. No. 739,317
Int. Cl. B01d 53/06
U.S. Cl. 55—73                                    8 Claims

ABSTRACT OF THE DISCLOSURE

An arrangement for removing contaminating gases from the atmospheres of closed environmental systems utilizing an endless belt fabricated from a porous or fibrous material treated chemically to adsorb $CO_2$ or other gases from the surrounding atmosphere. The moving belt, after adsorbing the gas, enters a zone of hot water which causes the adsorbed gas to be released.

The invention described herein may be manufactured and used by or for the Government of the United States of America for governmental purposes without the payment of any royalties thereon or therefor.

BACKGROUND OF THE INVENTION

The present invention relates to air purification systems and more particularly to carbon dioxide removal systems of the adsorption type and adapted to be utilized for a closed compartment.

Prior art devices for removing $CO_2$ from submarine atmospheres make use of a continuous liquid absorption process utilizing a water solution of monoethanolamine MEA as the absorbent chemical. The MEA solution absorbs $CO_2$ from processed air by intimate contact in a packed column, and releases it when heated, under elevated pressure, to the boiling point. A disadvantage of this process is that the air which has been in contact with the MEA solution, upon re-entering the environment from which it came, is contaminated with vapors of the volatile MEA and with ammonia gas, which is formed as a result of the foaming and chemical degradation of the MEA. These vapors are considered toxic to humans, and highly corrosive to ships' equipment.

A further disadvantage is that air must be supplied to the process at relatively high pressures (20 to 25 inches of water column) by either high-speed or excessively large blowers, requiring excessive power and maintenance.

Alternative prior art methods for removing $CO_2$ utilize a solid adsorbent material, in granular form, packed in several large chambers. Process air passes through one chamber in which the $CO_2$ is adsorbed, while the other chambers are heated or cooled as necessary to reactivate the adsorbent and prepare it for the adsorption step. The air stream is, at regular intervals, shifted from one chamber to another. This method suffers from the need for a rather complicated switching arrangement which also is prone to failure, particularly when operated continuously for extended periods. These systems also require that the adsorbent be heated to relatively high temperatures for satisfactory reactivation.

SUMMARY

The general purpose of this invention is to provide an arrangement for removing contaminating gases from the atmospheres of closed environmental systems in a manner having all of the advantages of similarly employed prior art devices and none of the above described disadvantages. To attain this, the present invention utilizes an endless belt fabricated from a porous or fibrous material, treated chemically to adsorb $CO_2$ or other gases from the surrounding atmosphere. The treatment adds active, chemical groups to the surface of the material, which retains adequate strength and flexibility. The moving belt, after adsorbing the gas, enters a zone of hot water, which causes the adsorbed gas to be released.

An object of the present invention is to provide adsorption apparatus of improved efficiency, simplicity and long life.

Another object of the present invention is to provide apparatus for use in controlling the quality of air for breathing and other air functions.

A still further object of this invention is the separation of minor amounts of gases and other gas-carried substances from a major amount of other gases.

A still further object is to provide improved separation and removal of contaminating substances from an enclosed atmosphere.

BRIEF DESCRIPTION OF THE DRAWINGS

The exact nature of this invention, as well as other objects and advantages thereof, will be readily apparent from consideration of the following specification related to the annexed drawings in which.

DESCRIPTION OF THE PREFERRED EMBODIMENT

Figure 1:
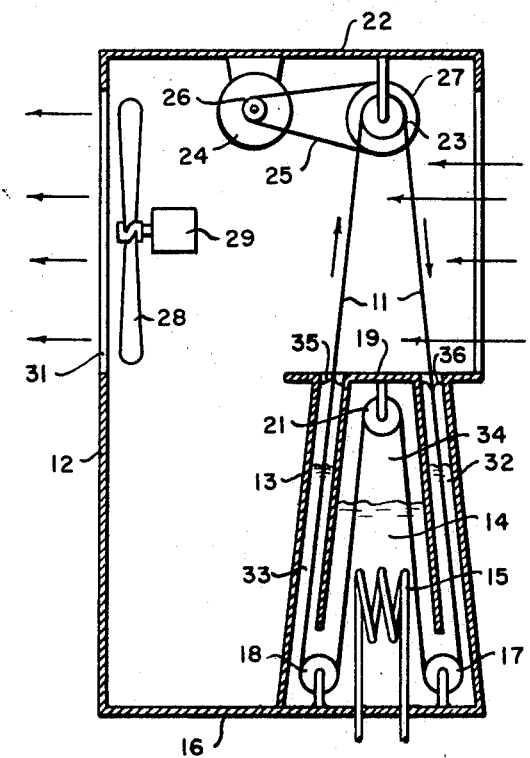
FIG. 1 shows a schematic diagram of an adsorption-reactivation arrangement.

A preferred embodiment of a gas separation apparatus which illustrates the present invention is shown in FIG. 1. The adsorbent material, in the form of an endless belt 11 is contained within a housing 12 formed from a suitable structural material. The nature of belt 11 will be later described in greater detail. The housing 12 is provided with a multiwalled tank unit 13 containing a fluid 14 which may preferably be a suitable liquid such as water. Fluid 14 may be heated by a heater 15 mounted in the tank unit 13. Attached to the bottom 16 of housing 12 are rollers 17 and 18. Attached to the top 19 of tank unit 13, in suspension, is roller 21. Rollers 17, 18 and 21 may preferably be spring mounted to compensate for possible dimensional changes to the endless belt 11.

Suspended or supported from the top 22 of housing 12 is drive roller 23 with its associated drive motor 24 of any suitable construction. A suitable drive connection such as the belt 25, drive pulley 26 and driven pulley 27 may be used to drive the endless belt 11.

A suitable exhaust fan 28, with its associated drive motor 29, may be mounted within housing 12 to exhaust air by pushing or pulling through the opening 31 in housing 12.

Passageways 32 and 33, located on opposite sides of tank unit 13, extend downwardly into tank unit 13 and serve as guide channels for the endless belt 11 and also as liquid seals to prevent the escape of $CO_2$ from a vapor space 34 within tank unit 13 located above the fluid 14. Located at the upper end of passageways 32 and 33 are a pair of mechanical wipers 35 and 36. Wipers 35, 36 of any suitable construction, are utilized to seal off the hot water vapors from the air stream and to prevent excessive wetting of the endless belt 11, which may interfere with subsequent gas adsorption. If pressure begins to build up in vapor space 34 due to gas accumulation, water will rise in the passageways 32 and 33 to a level equivalent to the pressure buildup. As will be shown in detail below, the pressure in vapor space 34 is regulated to prevent water from being forced past the seal wipers 35 and 36.

DESCRIPTION OF THE OPERATION

As shown in FIG. 1, atmospheric air from the surrounding environment is drawn into the apparatus, as indicated by the arrows, by the exhaust fan 28. The atmospheric air, containing $CO_2$ is forced to pass through the endless belt 11 before being returned to the environment, partially depleted of its $CO_2$ content. Endless belt 11 adsorbs a fraction of the $CO_2$ from the air as it passes over the roller arrangement driven by drive roller 23. Roller 23 may preferably be driven by an electric motor such as 24, at a relatively slow speed through a pulley and belt arrangement as shown in FIG. 1. Idler rollers 17, 18 and 21 may preferably be spring mounted to compensate for possible dimensional changes to the belt 11 as a result of expansion or shrinkage.

The belt 11, with adsorbed $CO_2$ on its surface, is then reactivated by passage through the hot water 14, maintained at a temperature at or near the boiling point by a heater such as heater 15. As the belt 11 is heated, $CO_2$ gas is released, bubbles up through the hot water 14, thereby accumulating in vapor space 34.

Upon leaving the reactivation chamber, the belt 11 again comes in intimate contact with the process air stream, which cools it rapidly by convection and by evaporation of the remaining free water. As it cools, belt 11 begins to adsorb $CO_2$ from the process air, thereby completing the cycle.

Figure 2:
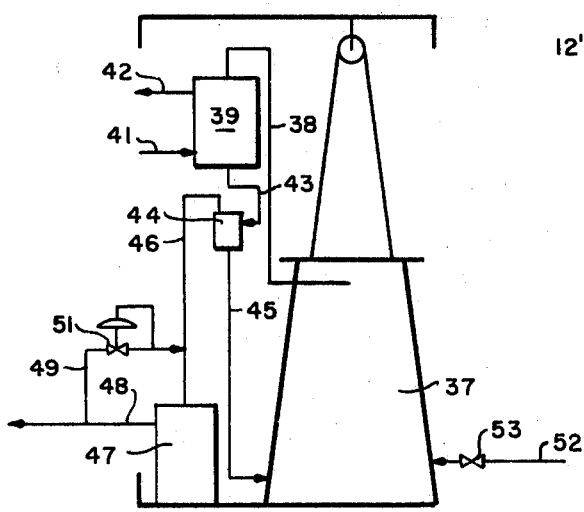
FIG. 2 shows a process flow diagram in accordance with the invention.

FIG. 2 shows a process flow diagram of a $CO_2$ removal system in accordance with the invention. Carbon dioxide gas is evolved in the reactivator unit 37 i.e. corresponding to the tank unit 13 and is removed via conduit 38 to a cooling unit 39 of any suitable well known construction. Cooling water enters cooling unit 39 through conduit 41 and is removed through conduit 42, thereby lowering the temperature of the water-saturated $CO_2$ gas causing moisture to condense. The water-$CO_2$ mixture then passes through conduit 43 into a separator unit 44 where separation of the gas and liquid phases occurs. Condensed and separated water leave separator unit 44 through a conduit 45 and return to the reactivator unit 37 for reuse. The water free $CO_2$ gas leaves separator 44 through a conduit 46 and enters the $CO_2$ ejector unit 47 of any suitable well known construction where the gas pressure is raised to the desired level (ambient sea pressure in the case of submarines) before ejection through a conduit 48.

For each particular application, the capacity of ejector unit 47 may preferably be somewhat in excess of the maximum capacity of the entire system. This excess capacity insures against a continuous build-up of pressure in the $CO_2$ delivery system comprising conduits 38, 43, 45 and 46, separator unit 44, cooling unit 39 and reactivator unit 37. To prevent a buildup of vacuum in the $CO_2$ delivery system, excess $CO_2$ from conduit 48 is diverted back to conduit 46 through conduit 49 and a suitable reducing valve 51. Reducing valve 51 may preferably be adjusted to maintain the $CO_2$ delivery system at substantially atmospheric (ambient) pressure, e.g., within plus or minus six inches of water column.

Additional water, to replace water lost in the system, may be added through conduit 52 and valve 53 which may be operated either manually or automatically through a liquid level controller (not shown) connected to the reactivator 37.

Figure 3:
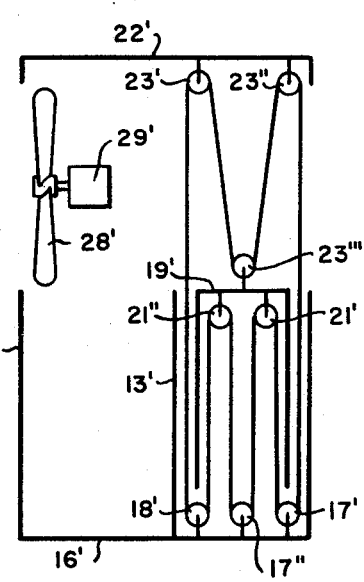
FIG. 3 shows an alternative embodiment of the arrangement shown in FIG. 1.

An alternative embodiment in accordance with the invention is shown in FIG. 3. Additional rollers 23″, 23‴, 17″ and 21″ may be provided dependent upon the overall removal capacity desired. Thus the number of rollers may be varied as desired to provide more or less distance of travel of the endless belt in either the adsorption or reactivation sections or processing stations if longer or shorter exposure times become necessary.

The endless belt 11 or "ionic screen" of this invention, may preferably be a self-supporting adsorbent material which can be wound over rollers to form a continuous, endless belt. It may be capable of adsorbing a contaminant gas or gases, e.g. $CO_2$, from air at room temperature and capable of being reactivated by exposure to hot water (preferably below 212° F.). Materials having these characteristics are:

(a) Anion exchange resins, such as Amberlite IR–45, imbedded between inert metal screens or plastic woven fabrics so as to form a continuous, quilted belt. This type of resin is specific for acid gases, such as $CO_2$, hydrogen sulfide ($H_2S$), sulfur dioxide ($SO_2$), etc.;

(b) Woven fabrics of thin, flexible, cross linked fibers of polymeric amines having the general formula $$(-CH_2-CH_2NR-)$$

where R is hydrogen (H) or methyl ($CH_3$). These types also are specific for acidic gases.

The capacity and size of a gas removal system in accordance with the principles of this invention, is a function of:

(a) The type of adsorbent material used;
(b) The velocity of the process air stream;
(c) The temperature, humidity, and gas content of the process air stream;
(d) The thickness, porosity, width, and surface area of the adsorbent material;
(e) The linear speed of movement of the adsorbent material;
(f) The time of exposure of the adsorbent material to the air stream;
(g) The time of exposure of the adsorbent material to the regenerating hot liquid;
(h) The temperature of the hot liquid.

Considering all of the above factors, a finalized design may be optimized for a given end use if the characteristics of the ionic screen are known and the overall removal capacity is defined.

The advantages provided by the present invention are particularly important when considering $CO_2$ removal equipment in submarines, space vehicles, and other environments where high reliability and small volume are critical factors. Reduced contamination is provided by an "ionic screen" for $CO_2$ removal and the need for volatile, chemically degradable chemicals, such as MEA, is eliminated. The air being treated by the invention is free of potentially toxic and corrosive gases, such as ammonia and MEA vapors.

Simplicity of operation is achieved by the use of a solid adsorbent, in a continuously operating process, thereby eliminating the multiplicity of adsorption chambers and automatically cycling valves normally required in an intermittent process. Operator's attention required for the process of this invention is minimal, in comparison with conventional solid adsorption systems.

High reliability is provided by eliminating rapidly switching valves operating continuously for long periods and their normally associated frequent and troublesome breakdowns. The nature of the adsorption screen of the present invention is such that process air may be passed through with extremely low loss of pressure. Therefore, it is practicable to use a high-flow, low-head fan to provide the necessary air movement. Such fans are inherently trouble-free in contrast to the relatively high-pressure blowers required in conventional $CO_2$ removal systems. Utilization of the liquid water seal of the present invention to contain the evolved $CO_2$ gas while providing essentially free movement of the adsorbent screen represents a great improvement over the troublesome mechanical seals utilized in certain processes employing moving adsorption beds.

Prior art, multibed systems require oversized components such as heaters and $CO_2$ ejectors to handle the varying loads associated with intermittent processes. Furthermore, multibed, solid adsorption systems generally employ two or three deep beds of granular materials, only one of which is in use at any given time to adsorb CO₂. Because of this, the volume and weight of adsorbent in the system is relatively large. In contrast, the ionic screen of the present invention will preferably be in the order of 25 to 50 pounds whereas the granular adsorbent weight would be about 300 to 500 pounds. Furthermore, a continuous process characteristically uses less electrical power and cooling water than an intermittent process does.

Obviously, many modifications and variations of the present invention are possible in the light of the above teachings. It is therefore to be understood that the invention may be practiced otherwise than as specifically described.

What is claimed is:

1. The method of separating unwanted gases from a stream of gases in an essentially closed environment comprising the steps of:
    directing the stream of gases into a substantially continuously moving adsorbent means to separate adsorbable gases from the stream;
    immersing said moving adsorbent means containing adsorbed gases in a heated liquid thereby causing by contact of the adsorbent means with the heated liquid the unwanted gases to separate from said adsorbent means;
    containing the separated gases for further distribution to a second separation process and to waste disposal; and
    cooling said moving adsorbent means with the stream of gases as the means emerges from said heated liquid,
    whereby said adsorbent means is simultaneously and continuously separating gases at a first station, being reactivated at a second station and being cooled and dried at a third station for enabling further adsorption.

2. The method of separating unwanted gases from a stream of gases as defined in claim 1, wherein said step of containing the evolved gases for further distribution comprises:
    cooling said evolved gases thereby causing vapor to condense;
    separating unwanted gases from the condensed vapor;
    returning the condensed vapor to said heated liquid source; and
    disposing of said unwanted gases.

3. Apparatus for cleaning an air stream, the combination comprising:
    a housing having an air inlet and an air outlet and including upright, top and bottom walls forming an upper and a lower chamber;
    means for circulating air to be cleaned through and out of said housing;
    an essentially self-sustaining liquid reservoir within said lower chamber below said air inlet;
    at least two passageways located on opposite sides of said liquid reservoir adapted to form a liquid seal at one end thereof;
    a pourous material having the characteristic of absorbing unwanted gases from said stream, said material being in the form of a web extending downwardly through said upper chamber and comprising a continuously downwardly and upwardly moving porous screen for the circulating air and extending downwardly into said passageways, said porous material being driven and directed in a continuous path by a plurality of rollers mounted within said housing on the top and bottom walls, said porous material adsorbing unwanted gases on at least one section which is facing said air inlet, and releasing said unwanted gases on at least one section which is immersed in said liquid reservoir;
    wiper means mounted within said passageways at the end forming a liquid seal, said wipers being adapted to form a seal with said porous material to prevent excessive wetting thereof and to seal off hot vapors from said air stream; and
    means for controlling the gas and liquid level of said liquid reservoir and disposing of the unwanted gases,
    whereby unwanted gases are adsorbed by said porous material and released within said liquid reservoir as a porous material is continuously cycled through said upper and lower chambers.

4. Apparatus for cleaning an air stream comprising:
    housing means having an air inlet and an air outlet, said housing means comprising an upper and a lower chamber;
    heated liquid reservoir and gas containing means located within said lower chamber and below said air inlet;
    means forming a movable endless belt within said housing for intercepting air passing from said air inlet and for subsequent immersion in said liquid reservoir means and for adsorbing unwanted gases on at least one section of the belt then intercepting air from said air inlet and for releasing from the reservoir means said unwanted gases already adsorbed by at least one section of the belt when immersed in said reservoir means, said reservoir means further comprising:
    at least one passageway for guiding said movable endless belt;
    sealing means located in each passageway adapted to contact said endless belt in sealing fashion thereby providing a vapor seal for gases and vapors above the surface of the liquid in reservoir means;
    means fluidly coupled to said liquid reservoir means for controlling the gas and liquid levels of said containing means and for disposing of waste gases, said means for controlling comprising:
    cooling means for condensing unwanted vapors;
    means for separating gases and liquids from said vapors and for replenishing the liquid in said reservoir means; and
    means for raising the pressure of said gas for ejection of unwanted gases,
    whereby wanted gases contained in said air stream are adsorbed by said means forming an endless belt and released in said reservoir means and directed to waste disposal.

5. Apparatus for cleaning an air stream as defined in claim 4 in which said means forming an endless belt comprises:
    an ionic screen of self-supporting adsorbent material.

6. Apparatus as defined in claim 5 wherein said ionic screen comprises:
    anion exchange resins imbedded between inert materials to form a quilted surface on said belt.

7. Apparatus as defined in claim 4 wherein said endless belt means comprises:
    woven fabrics on thin, flexible, cross-linked fibers of polymeric amines having the general formula $(-CH_2-CH_2NR-)$ where R is hydrogen (H).

8. Apparatus as defined in claim 7 wherein R is methyl ($CH_3$).

References Cited
UNITED STATES PATENTS

| | | | |
|---|---|---|---|
| 2,222,828 | 11/1940 | Guthrie | 55—390 |
| 2,713,077 | 7/1955 | Rieve | 23—2.1 |
| 3,398,509 | 8/1968 | Tamura et al. | 55—77 |
| 3,405,508 | 10/1968 | Peters et al. | 55—77 |
| 3,407,045 | 10/1968 | Temple | 23—283 |
| 3,420,773 | 1/1969 | Selmeczi | 210—32 |

REUBEN FRIEDMAN, Primary Examiner

C. N. HART, Assistant Examiner

U.S. Cl. X.R.

55—390